(12) United States Patent
Wang et al.

(10) Patent No.: US 6,191,197 B1
(45) Date of Patent: Feb. 20, 2001

(54) EXTENDED POLYMER COMPOSTION DERIVED FROM BLENDS OF ELASTOMERS AND SYNDIOTACTIC POLYSTYRENE

(75) Inventors: Xiaorong Wang; Xiao-Liang Luo, both of Akron; Frank J. Clark, Massillon; Hideo Takeichi, Akron; James E. Hall, Mogadore, all of OH (US); Takahiro Matsuse; Naruhiko Mashita, both of Kodaira (JP); Shinichi Toyosawa, Tokorozawa (JP)

(73) Assignee: Bridgestone Corporation, Tokyo (JP)

( * ) Notice: Under 35 U.S.C. 154(b), the term of this patent shall be extended for 0 days.

(21) Appl. No.: 08/710,828

(22) Filed: Sep. 23, 1996

(51) Int. Cl.[7] ............................. C08L 95/00; C08K 5/52; C08K 5/09; C08K 5/01

(52) U.S. Cl. ............................. 524/71; 524/116; 524/141; 524/145; 524/169; 524/232; 524/267; 524/296; 524/297; 524/308; 524/313; 524/385; 524/397; 524/398; 524/403; 524/483; 524/485; 524/487; 524/490

(58) Field of Search ........................... 524/485, 487, 524/483, 267, 296, 297, 141, 145, 168, 169, 232, 397, 399, 71, 116, 318, 308, 313, 388, 385, 490

(56) References Cited

U.S. PATENT DOCUMENTS

| | | | |
|---|---|---|---|
| 2,875,170 | * 2/1959 | Ayers et al. | 260/33.6 |
| 3,346,528 | * 10/1967 | Slocombe et al. | 524/168 |
| 3,639,520 | 2/1972 | Onishi et al. . | |
| 3,953,542 | 4/1976 | Halasa et al. . | |
| 3,953,543 | 4/1976 | Futamura et al. . | |
| 3,959,412 | 5/1976 | Oberlin . | |
| 4,117,041 | * 9/1978 | Guschl | 524/116 |
| 4,503,204 | 3/1985 | Bingham et al. . | |
| 4,520,138 | 5/1985 | Himes . | |
| 4,622,352 | 11/1986 | Dijiauw et al. . | |
| 4,680,353 | 7/1987 | Ishihara et al. . | |
| 4,790,365 | 12/1988 | Sandstrom et al. . | |
| 4,794,132 | 12/1988 | Dijiauw et al. . | |
| 4,853,154 | 8/1989 | Icenogle et al. . | |
| 4,853,436 | 8/1989 | Ohata et al. . | |
| 4,882,378 | 11/1989 | Himes . | |
| 4,904,725 | 2/1990 | Himes . | |
| 5,034,441 | * 7/1991 | Nakano et al. | 524/385 |
| 5,066,741 | 11/1991 | Campbell, Jr. . | |
| 5,071,953 | * 12/1991 | Nakano et al. | 528/496 |
| 5,082,717 | * 1/1992 | Yaguchi et al. | 526/160 |
| 5,093,422 | 3/1992 | Himes . | |
| 5,109,068 | * 4/1992 | Yamasaki et al. | 525/151 |
| 5,145,950 | * 9/1992 | Funaki et al. | 528/503 |
| 5,155,080 | 10/1992 | Elder et al. . | |
| 5,162,278 | 11/1992 | Razavi . | |
| 5,164,479 | * 11/1992 | Funaki et al. | 528/502 |
| 5,169,706 | 12/1992 | Collier, IV et al. . | |
| 5,169,893 | * 12/1992 | Beck | 524/485 |
| 5,171,834 | * 12/1992 | Funaki | 528/493 |
| 5,183,871 | * 2/1993 | Yamasaki et al. | 524/120 |
| 5,200,454 | * 4/1993 | Nakano | 524/410 |
| 5,206,197 | 4/1993 | Campbell, Jr. . | |
| 5,223,467 | 6/1993 | Razavi . | |
| 5,223,468 | 6/1993 | Razavi . | |
| 5,225,500 | 7/1993 | Elder et al. . | |
| 5,243,002 | 9/1993 | Razavi . | |
| 5,247,020 | * 9/1993 | Nakano et al. | 525/249 |
| 5,250,629 | 10/1993 | Tani et al. . | |
| 5,260,126 | 11/1993 | Collier, IV et al. . | |
| 5,260,394 | 11/1993 | Tazaki et al. . | |
| 5,273,830 | * 12/1993 | Yaguchi et al. | 428/523 |
| 5,278,265 | 1/1994 | Razavi . | |
| 5,283,117 | * 2/1994 | Arai et al. | 428/343 |
| 5,283,294 | 2/1994 | Hsu et al. . | |
| 5,288,791 | 2/1994 | Collier, IV et al. . | |
| 5,292,838 | 3/1994 | Razavi . | |
| 5,294,685 | 3/1994 | Watanabe et al. . | |
| 5,304,523 | 4/1994 | Razavi . | |
| 5,304,599 | 4/1994 | Himes . | |
| 5,322,869 | * 6/1994 | Yamasaki et al. | 524/117 |
| 5,340,892 | 8/1994 | Kuramoto . | |
| 5,356,944 | * 10/1994 | Blythe et al. | 521/146 |
| 5,362,814 | * 11/1994 | Machida et al. | 525/247 |
| 5,373,031 | * 12/1994 | Funaki et al. | 522/160 |
| 5,391,603 | * 2/1995 | Wessel et al. | 524/399 |
| 5,391,611 | * 2/1995 | Funayama et al. | 524/508 |
| 5,391,629 | 2/1995 | Turner et al. . | |
| 5,395,890 | * 3/1995 | Nakano et al. | 525/165 |

(List continued on next page.)

FOREIGN PATENT DOCUMENTS

| | | | |
|---|---|---|---|
| 702610 | * 1/1965 | (CA) | 524/168 |
| 280357 | * 8/1988 | (EP) | 524/71 |
| 0 440 922 A1 | 8/1991 | (EP) . | |

OTHER PUBLICATIONS

*Crystallization Kinetics of Isotactic Polystyrene from Isotactic–Atactic Polystyrene Blends* G.S.Y. Yeh and S.L. Lambert; Journal Polym. Sci. A–2(10), 1183–1191(1972).

*Block Copolymers of Isotactic Polypropylene and 1,4–Polybutadiene* M.A. Drzewinski and R.E. Cohen; J. Polym. Sci. Part A: Polym. Chem. 24, 2457 (1986), References therein.

*Polyethylene diblock copolymers: direct syntheses and morphological analysis* M.A. Drzewinski: Polymer, 35, 5024 (1994).

Primary Examiner—Veronica P. Hoke
(74) Attorney, Agent, or Firm—David G. Burleson; Ann M. Skerry

(57) ABSTRACT

There are disclosed a gel or polymer composition which comprises 100 parts by weight of a polymer blend component comprising 1 to 90% by weight of a poly(vinyl aromatic hydrocarbon) polymer having a syndiotactic configuration and 99 to 10% by weight of a rubbery elastomer and at least 30 parts by weight of an extender oil or a low molecular weight organic component. These gel compositions have super soft properties, heat resistance, and/or damping properties.

28 Claims, No Drawings

U.S. PATENT DOCUMENTS

| | | |
|---|---|---|
| 5,412,024 | 5/1995 | Okada et al. . |
| 5,418,276 | 5/1995 | Machida et al. . |
| 5,418,279 * | 5/1995 | Ren et al. .............................. 524/141 |
| 5,418,290 * | 5/1995 | Machida et al. ........................ 525/88 |
| 5,428,120 | 6/1995 | Newman et al. . |
| 5,436,397 | 7/1995 | Okada . |
| 5,444,126 * | 8/1995 | Okada et al. ......................... 525/391 |
| 5,451,484 * | 9/1995 | Fukahori et al. .................... 524/502 |
| 5,453,474 | 9/1995 | Newman et al. . |
| 5,459,117 | 10/1995 | Ewen . |
| 5,494,874 | 2/1996 | Rosen et al. . |
| 5,510,434 | 4/1996 | Takeuchi . |
| 5,512,643 | 4/1996 | Newman et al. . |
| 5,525,667 * | 6/1996 | Forbes et al. ......................... 524/490 |
| 5,543,462 * | 8/1996 | Okada et al. .......................... 525/74 |
| 5,777,028 * | 7/1998 | Okada et al. .......................... 525/86 |

* cited by examiner

EXTENDED POLYMER COMPOSTION DERIVED FROM BLENDS OF ELASTOMERS AND SYNDIOTACTIC POLYSTYRENE

BACKGROUND OF THE INVENTION

1. Field of the Invention

The present invention relates to novel oil extended polystyrene compositions. More particularly, it pertains to a polymer gel blend of syndiotactic polystyrene, a rubbery elastomer and an extender oil.

2. Description of Prior Art

A styrenic polymer having syndiotactic configuration (sPS) is excellent in heat resistance and chemical resistance but displays a high Shore A hardness and is poor in impact resistance, flexibility and elasticity and therefore, the potential usage of this polymer has certain limitations. In order to solve the above-mentioned problem, attempts have been made to improve the impact resistance of sPS, for example, by blending a rubbery elastomer and/or other thermoplastic resin with sPS as displayed in U.S. Pat. Nos. 5,391,611; 5,395,890; and 5,247,020. However none of these patents disclose improvements in the blends resulting in softness, flexibility, elasticity and/or damping characteristics or the inclusion of oil or other extenders to achieve these properties.

It has been known in the past to extend thermoplastic elastomers with petroleum base oils such as naphthenic, aromatic and paraffinic oils and other low weight molecular organic materials in order to reduce costs and to improve the elastomeric properties of certain of the thermoplastic elastomers. In U.S. Pat. No. 5,451,454, owned by the current assignee, a blend of a high-molecular weight block copolymer having a hard block and a soft block and a large volume of oily or low molecular weight material provides a composition having unique softness, adequate mechanical strength and damping properties useful in many industrial applications. The heat resistance of this composition was not adequate for higher temperature applications including many uses in automobiles and electrical appliances.

It is extremely desirable to prepare a polymer composition having elastomeric characteristics, good mechanical strength, unique softness and various utilities in high temperature applications.

SUMMARY OF THE INVENTION

The object of the present invention under such circumstances is to provide an oil or low molecular weight component extended syndiotactic polystyrene-elastomeric polymer blend soft gel composition having damping properties useful in producing molded products having heat resistance and a high elasticity and damping property such as industrial materials such as electric and electronic materials, industrial construction materials, car parts, domestic electrical appliances and various mechanical parts.

The composition of the present invention consists of syndiotactic polystyrene (sPS) and a rubbery elastomer and then further blending 100 parts by weight of the polymer blend with at least 30 parts by weight of an extender such as oil or a low molecular weight component.

Specifically, the first aspect of the present invention provides a gel composition which comprises 100 parts by weight of a resin blend component comprising 1 to 90% by weight of a styrenic polymer having syndiotactic configuration and 99 to 10% by weight of an elastomeric polymer; and at least 30 part by weight of an extender oil or a low molecular weight component.

This invention concerns a gel composition useful in preparing products which have thermal stability, softness, excellent mechanical strength, moldability and damping characteristics. These thermoplastic elastomers containing compositions can be widely used as materials intermediate between rubber and plastics, or as rubber substitutes in automotive parts and others.

DESCRIPTION OF PREFERRED EMBODIMENT

The extended polymer blend gels of the present invention contain: 100 parts by weight of a polymer blend of: (1) 1 to 90% by weight of at least one elastomeric rubbery polymer and (2) 99 to 10% by weight of at least one syndiotactic poly(vinyl aromatic hydrocarbon), preferably polystyrene; and at least 30, preferably 30 to 1000, parts by weight of an extender such as an oil or a low molecular weight component. In a preferred embodiment, the extended polymer blend gels of the present invention comprise 5 to 80% by weight of syndiotactic poly(vinyl aromatic hydrocarbon), preferably syndiotactic polystyrene (sPS), and 95 to 20% by weight of rubbery elastomeric polymer. If the weight percent of the sPS polymer component is greater than 90% then the elasticity, softness and processability of the final composition is adversely effected. If the weight percent of the sPS polymer component is less than 1% substantial improvement in heat resistance and mechanical properties are not obtained.

The elastomeric rubbery polymers used in the oil-extended polymer blend gels in accordance with the present invention can be any elastomeric polymer, preferably thermoplastic elastomers, including: polybutadiene, polyisoprene, polyisobutylene, acrylic rubber, urethane rubber, silicone rubber, epichlorohydrin rubber, styrene/butadiene rubber (SBR), styrene/isoprene rubber (SIR), styrene/isoprene/butadiene rubber (SIBR), styrene-butadiene-styrene block copolymer (SBS) preferably having a butadiene/styrene weight ratio of about 90/10 to about 40/60, a styrene-butadiene block copolymer (SB), hydrogenated styrene-butadiene-styrene block copolymer (SEBS), hydrogenated styrene-butadiene block copolymer (SEB), styrene-isoprene-styrene block copolymer (SIS), styrene-isoprene block copolymer (SI), hydrogenated styrene-isoprene block copolymer (SEP), hydrogenated styrene-isoprene-styrene block copolymer (SEPS), styrene-ethylene/butylene-ethylene block copolymer (SEBE), styrene-ethylene-styrene block copolymer (SES), ethylene-ethylene/butylene block copolymer (EEB), ethylene-ethylene/butylene/styrene block copolymer (hydrogenated BR-SBR block copolymer), styrene-ethylene/butylene-ethylene block copolymer (SEBE), ethylene-ethylene/butylene-ethylene block copolymer (EEBE) and mixtures thereof. Preferable elastomeric polymers include hydrogenated styrene-butadiene-styrene block copolymer (SEBS), and random copolymers of styrene/butadiene (SBR) or block copolymers containing conjugated diene monomers and vinyl substituted aromatic hydrocarbons contributed units or hydrogenated versions thereof. All polymers and their hydrogenated counterparts are made by procedures well known to those skilled in the art.

Polymerizable 1,3-diene monomers that can be employed in the production of the elastomeric polymers used in the present invention are one or more 1,3-conjugated dienes containing from four to twelve, inclusive, carbon atoms per molecule. Exemplary monomers include 1,3-butadiene; isoprene; 2,3-dimethyl-1,3-butadiene; 1,3-pentadiene (piperylene); 2-methyl-3-ethyl-1,3-butadiene; 3-methyl-1,3-pentadiene; 1,3-hexadiene; 2-methyl-1,3-hexadiene;

3-butyl-1,3-octadiene; and the like. Among the dialkyl-1,3-butadienes, it is preferred that the alkyl groups contain from one to three carbon atoms. The preferred 1,3-diene monomer for use in the process of the present invention is 1,3-butadiene.

Exemplary vinyl substituted aromatic hydrocarbon monomers, commonly referred to as vinyl aromatic hydrocarbon monomers or VAM, for use in the production of the elastomeric polymers or in the syndiotactic poly(vinyl aromatic hydrocarbon) of the present invention include: styrene, alpha-methylstyrene; 1-vinylnaphthalene; 2-vinylnaphthalene; 1-alpha-methylvinylnaphthalene; 2-alphamethyl-vinylnaphthalene; and mixtures of these as well as halo, alkoxy, alkyl, cycloalkyl, aryl, alkaryl and aralkyl derivatives thereof in which the total number of carbon atoms in the combined hydrocarbon is generally not greater than 12. Examples of these latter compounds include: 4-methylstyrene; vinyl toluene; 3,5-diethylstyrene; 2-ethyl-4-benzylstyrene; 4-phenylstyrene; 4-para-tolylstyrene; and 4,5-dimethyl-1-vinylnaphthalene. Occasionally, di- and tri- vinyl aromatic hydrocarbons are used in small amounts in addition with mono-vinyl aromatic hydrocarbons. The preferred vinyl aromatic hydrocarbon is styrene.

The thermoplastic elastomers particularly useful in practicing the present invention are normally solid block (co)polymers, characteristically exhibiting high tensile strength and elongation in their natural condition, that is, in their green or unvulcanized state. Particularly useful are linear block or radial teleblock copolymers. More specifically, useful elastomers are hydrogenated styrene/butadiene/styrene block copolymer (SEBS). These polymers are prepared by methods well known in the art.

The butadiene/styrene copolymers, discussed above, generally contain about 40 to 90 weight percent butadiene and from 60 to about 10 weight percent of styrene; preferably, from about 50 to 80 weight percent butadiene and about 50 to about 20 weight percent styrene. Copolymers particularly useful in producing compositions in accordance with the present invention are those having from about 60 to about 75 weight percent butadiene. When less than about 10 percent styrene is employed, the resulting copolymers do not possess the requisite green tensile strength. On the other hand, more than 60 weight percent of the styrene in the copolymer results in a composition in which hardness is increased at the expense of elasticity. Useful (co)polymers will generally exhibit a weight average molecular weight in the range of from about 30,000 to about 500,000 but a range of about 50,000 to about 350,000 is preferable.

The poly(vinyl aromatic hydrocarbon) polymer, preferably polystyrene, useful in preparing the polymer blend of the present invention is any suitable styrenic polymer having syndiotactic configuration has a stereochemical structure of syndiotactic configuration, i.e. the stereostructure in which phenyl groups of substituted phenyl groups as side chains are located alternately at opposite directions relative to the main chain consisting of carbon-carbon bonds. Tacticity is quantitatively determined by the nuclear magnetic resonance method ($^{13}$C-NMR method) using carbon isotope. The tacticity as determined by the $^{13}$C-NMR method can be indicated in terms of proportions of structural units continuously connected to each other, i.e., a diad in which two structural units are connected to each other, a triad in which three structural units are connected to each other and a pentad in which five structural units are connected to each other. The styrenic polymer having such syndiotactic configuration as mentioned in the present invention can be polystyrene, poly(alkylstyrene), poly(halogenated styrene), poly(halogenated alkylstyrene), poly(alkoxystyrene), poly(vinyl benzoate), hydrogenated polymer thereof, the mixture thereof, and copolymers containing the above polymers as main components, having such a syndiotacticity as determined by the above-mentioned method that the proportion of racemic diad is at least 75%, preferably at least 85%, or the proportion of racemic pentad is at least 30%, preferably at least 50%. The poly(alkylstyrene) includes poly(methylstyrene), poly(ethylstyrene), poly(isopropylstyrene), poly(tert-butylstyrene), poly(phenylstyrene), poly(vinylnaphthalene) and poly(vinylstyrene). Poly(halogenated styrene) includes poly(chlorostyrene), poly(bromostyrene), and poly(fluorostyrene). Poly(halogenated alkylstyrene) includes poly(chloromethylstyrene). Poly(alkoxystyrene) includes poly(methoxystyrene), and poly(ethoxystyrene).

The particularly desirable styrenic polymer are polystyrene, poly(p-methylstyrene), poly(m-methylstyrene), poly(p-tert-butylstyrene), poly(p-chlorostyrene), poly(m-chlorostyrene), poly(p-fluorostyrene), hydrogenated polystyrene and the copolymer containing the structural units thereof. Preferred styrene monomers for use in the preparation of the syndiotactic polystyrene include styrene, alpha-methylstyrene, p-methylstyrene, and mixtures thereof.

The molecular weight of the styrenic polymer to be used in the present invention is not specifically limited, but is desirably 1,000 to 1,000,000, more desirably 5,000 to 500,000 in terms of weight-average molecular weight. The molecular-weight distribution, that is, the broadening of molecular weight of the styrenic polymer is not specifically limited as well, but may be in a wide range. A weight-average molecular weight of less than 1,000 is unfavorable since the composition or molding obtained is deteriorated thereby in the thermal and mechanical properties.

The melting point temperature of the styrenic polymer in the present invention is necessarily greater than 150° C., most preferably greater than 200° C. to permit the block polymer to have high temperature applications.

The styrenic polymer having such syndiotactic configuration can be produced by any process known to those skilled in the art such as by polymerizing a styrenic monomer which corresponds to the above styrenic polymer in the presence of a suitable solvent by the use of a catalyst comprising a titanium compound and a condensation product of water and trialkylaluminum (Japanese Patent Application Laid-Open No. 187708/1987). In addition, the poly(halogenated alkylstyrene) and the hydrogenated product thereof can be produced by the processes described in Japanese Patent Application Laid-Open Nos. 46912/1989 and 178505/1989, respectively.

It is preferred in the present invention to prepare a polymer blend having one syndiotactic polystyrene and at least one elastomeric polymer. In the following discussion and claims the term syndiotactic polystyrene represents polymers formed from any of the above discussed vinyl aromatic hydrocarbon monomers or mixtures thereof having a syndiotactic configuration.

The polymer gels of the present invention have an extender added to the prepared polymer blend during final processing. Suitable extenders include extender oils and low molecular weight compounds or components. Suitable extender oils include those well known in the art such as naphthenic, aromatic and paraffinic petroleum oils and silicone oils.

Examples of low molecular weight organic compounds or components useful as extenders in the compositions of the present invention are low molecular weight organic materials having a number-average molecular weight of less than 20,000, preferable less than 10,000, and most preferably less than 5,000. Although there is no particular limitation to the material which may be employed, the following is a list of examples of appropriate materials:

(1) Softening agents, namely aromatic naphthenic and paraffinic softening agents for rubbers or resins;

(2) Plasticizers, namely plasticizers composed of esters including phthalic, mixed phthalic, aliphatic dibasic acid, glycol, fatty acid, phosphoric and stearic esters, epoxy plasticizers, other plasticizers for plastics, and phthalate, adipate, sebacate, phosphate, polyether and polyester plasticizers for NBR;

(3) Tackifiers, namely coumarone resins, coumarone-indene resins, terpene phenol resins, petroleum hydrocarbons and rosin derivative;

(4) Oligomers, namely crown ether, flourine-containing oligomers, polybutenes, xylene resins, chlorinated rubber, polyethylene wax, petroleum resins, rosin ester rubber, polyalkylene glycol diacrylate, liquid rubber (polybutadiene, styrene/butadiene rubber, butadiene-acrylonitrile rubber, polychloroprene, etc.), silicone oligomers, and poly-α-olefins;

(5) Lubricants, namely hydrocarbon lubricants such as paraffin and wax, fatty acid lubricants such as higher fatty acid and hydroxy-fatty acid, fatty acid amide lubricants such as fatty acid amide and alkylene-bis-fatty acid amide, ester lubricants such as fatty acid-lower alcohol ester, fatty acid-polyhydric alcohol ester and fatty acid-polyglycol ester, alcoholic lubricants such as fatty alcohol, polyhydric alcohol, polyglycol and polyglycerol, metallic soaps, and mixed lubricants; and (6) Petroleum hydrocarbons, namely synthetic terpene resins, aromatic hydrocarbon resins, aliphatic hydrocarbon resins, aliphatic cyclic hydrocarbon resins, aliphatic or alicyclic petroleum resins, aliphatic or aromatic petroleum resins, polymers of unsaturated hydrocarbons, and hydrogenated hydrocarbon resins.

Other appropriate low-molecular organic materials include latexes, emulsions, liquid crystals, bituminous compositions, and phosphazenes. One or more of these materials may be used as extenders.

In accordance with the present invention, the polymer blend containing gel composition of the present invention may have added thereto at least about 30, preferably 30 to 1,000, parts by weight of extender per 100 parts by weight of the polymer blend. Most preferred amounts of added extender include from about 50 to about 500 parts of oil per 100 parts of polymer blend and ideally about 80 to about 300 parts of extender per 100 parts of polymer blend. The extended polymer blend gels of the present invention contain: 100 parts by weight of a polymer blend of: (1) 99 to 10% by weight of at least one elastomeric rubbery polymer and (2) 1 to 90% by weight of at least one syndiotactic poly(vinyl aromatic hydrocarbon), preferably polystyrene; and as an extender at least 30, preferably 30 to 1,000, parts by weight of an oil or low molecular weight component. In a preferred embodiment, the polymer blend comprises 95 to 50% by weight of rubbery elastomeric polymer and 5 to 50% by weight of syndiotactic poly(vinyl aromatic hydrocarbon), preferably syndiotactic polystyrene (sPS).

The polymer gels produced according to the present invention generally have high damping properties having a tan δ in the range of about 1 to about 0.10, preferably higher than 0.2 over the temperature range of 30° C. to 100° C., and a Shore A hardness ranging from 0 to about 50, preferably about 1 to about 50, most preferably about 5 to 20 at about 20° C. to 25° C. or at room temperature. The service temperature of the gels of the present invention is less than or equal to 100° C. for most of the blends of the present invention, e.g., 100° C. compression set of the gel is about 80. Some of the extended polymer blends of the present invention have a potential use up to 150° C.

It is frequently desirable to include other additives well known in the rubber art to the compositions of the present application. Stabilizers, antioxidants, conventional fillers, reinforcing agents, reinforcing resins, pigments, fragrances and the like are examples of some such additives. Specific examples of useful antioxidants and stabilizers include 2-(2'-hydroxy-5'-methylphenyl) benzotriazole, nickel dibutyldithiocarbamate, zinc dibutyl dithiocarbamate, tris (nonylphenyl) phosphite, 2,6-di-t-butyl-4-methylphenol and the like. Exemplary conventional fillers and pigments include silica, carbon black, titanium dioxide, iron oxide and the like. These compounding ingredients are incorporated in suitable amounts depending upon the contemplated use of the product, preferably in the range of 1 to 350 parts of additives or compounding ingredients per 100 parts of polymer.

A reinforcement may be defined as the material that is added to a resinous matrix to improve the strength of the polymer. Most of these reinforcing materials are inorganic or organic products of high molecular weight. Various examples include glass fibers, asbestos, boron fibers, carbon and graphite fibers, whiskers, quartz and silica fibers, ceramic fibers, metal fibers, natural organic fibers, and synthetic organic fibers. Other elastomers and resins are also useful to enhance specific properties like damping properties, adhesion and processability. Examples of other elastomers and resins include adhesive-like products including Reostomer (produced by Riken-Vinyl Inc.), hydrogenated polystyrene-(medium or high 3,4) polyisoprene-polystyrene block copolymers such as Hybler (produced by Kurare Inc.), polynorbornenes such as Norsorex (produced by Nippon Zeon Inc.) and the like.

The gels containing oil or low molecular weight component extended thermoplastic elastomer and syndiotactic polystyrene compositions of the present invention may be prepared by any means well known in the art for combining such ingredients, such as solution blending, milling, internal batch mixing, or continuous extrusion of a solid form of elastomer/syndiotactic polystyrene blend and the other ingredients. A rapid and convenient method of preparation comprises heating a mixture of the components to a temperature of about 50° C. to about 290° C.

The gels containing oil extended thermoplastic elastomer and syndiotactic polystyrene compositions of the present invention of this invention can be manufactured by mixing and dynamically heat-treating the components described above, namely, by melt-mixing. As for the mixing equipment, any conventional, generally known equipment such as an open-type mixing roll, closed-type Banbury mixer, extruding machine, kneader, continuous mixer, etc., is acceptable. The closed-type is preferable, and mixing in an inactive gas environment, such as nitrogen or carbon dioxide, is also preferable. The preferred method of mixing and kneading the components of this invention is to mix and knead all the extender, such as oil, with the polymer components for 1–10 minutes, then to add other components, such as fillers, and mix again for 1–30 minutes.

The composition obtained using the manufacturing method of this invention can be molded with equipment conventionally used for molding thermoplastics. It is suitable for extrusion molding, calendar molding, and particularly injection molding.

The composition of the present invention can be mixed in any conventional mixer such as a Banbury mixer or roll mill or extruder normally conducted within the temperature range of about 250° C. to about 300° C., preferably maintaining the composition above its melting point for a few minutes up to several hours, preferably 3 to 30 minutes. A particularly useful technique is to add any fillers in the beginning of the mixing cycle in order to take maximum advantage of heating time and to prevent surface bleeding and overheating when forming the molded articles.

The resultant gel composition may be molded in appropriate press ovens and the like to form products in the form of extruded pellets, cut dices, preferably as small as possible since smaller pellets provide short heating times and better flow when utilized in flow molding. Ground pellets may also be utilized.

The extended polymer blends of the instant invention can be used in high temperature applications including uses in injection molding or in any other compositions typically containing used for elastomeric properties.

In summary, the molded polymers produced from the gels containing extended syndiotactic polystyrene-elastomeric polymer blend compositions of the present invention retain elastomeric characteristics and are useful in high temperature applications and/or high damping applications. Damping is the absorption of mechanical energy by a material in contact with the source of that energy. It is desirable to damp or mitigate the transmission of mechanical energy from, e.g., a motor, engine, or power source, to its surroundings. Elastomeric materials are often used for this purpose. It is desirable that such materials be highly effective in converting this mechanical energy into heat rather than transmitting it to the surroundings. It is further desirable that this damping or conversion is effective over a wide range of temperatures and frequencies commonly found near motors, automobiles, trucks, trains, planes, and the like.

A convenient measure of damping is the determination of a parameter called tan δ. A forced oscillation is applied to a material at frequency f and the transmitted force and phase shift are measured. The phase shift angle delta is recorded. The value of tan δ is proportional to the ratio of (energy dissipated)/(energy stored). The measurement can be made by any of several commercial testing devices, and may be made by a sweep of frequencies at a fixed temperature, then repeating that sweep at several other temperatures, followed by the development of a master curve of tan δ vs. frequency by curve alignment. An alternate method is to measure tan δ at constant frequency (such as at 10 hz) over a temperature range. We have defined a thermoplastic unfilled material as useful for damping when tan δ>~0.3 over at least a 4 decade range, preferably a 6 decade range of frequency.

It is further important that this high degree of absorption of energy be accompanied by good mechanical and thermal stability, as the part prepared from the subject polymers will be cycled through various environments and repeatedly such to various forces of compression, tension, bending, and the like.

The compositions of the present invention are favorably used in the manufacturing of any product in which the following properties are advantageous: a high degree of softness, heat resistance, decent mechanical properties, elasticity and/or high damping. The compositions of the present invention can be used in all industry fields, in particular, in the fabrication of automotive parts, household electrical appliances, industrial machinery, precision instruments, transport machinery, constructions, engineering, and medical instruments.

Representative examples the use of damping materials, vibration restraining materials, cushion gel are connecting materials such as sealing materials, packing, gaskets and grommets, supporting materials such as mounts, holders and insulators, and cushion materials such as stoppers, cushions, and bumpers. These materials are also used in equipment producing vibration or noise and household electrical appliances, such as in air-conditioners, laundry machines, refrigerators, electric fans, vacuums, driers, printers and ventilator fans. Further, these materials are also suitable for impact absorbing materials in audio equipment and electronic or electrical equipment, sporting goods and shoes. Further, as super low hardness rubbers, these materials are applicable for use in appliances, damping rubbers, and as low hardness plastics, it is preferable for molding materials. Further, because the present compositions can be used to control the release of internal low molecular weight materials out from the compositions, it is useful as a release support to emit materials such as fragrance materials, medical materials and other functional materials. The compositions of the present invention also possess utility in applications of use in liquid crystals, adhesive materials and coating materials.

Specific examples of uses of the compositions of the present invention as damping materials are as follows:

(1) in audio equipment, such as in insulators for a portable CD or a CD mounted on a vehicle, mike holders for home video cassette recorder, radio cassette recorder, karaoke or handy mike, etc., an edge cone of a speaker, a tape holder of a radio cassette, a holder of a portable mini-disk player, an optical disk holder of a digital video disk, etc.;

(2) in information relating equipment, such as in insulators for a hard disk, insulators for motors such as a spindle motor for HHD and stepping motor, insulators for floppy disk drive, insulators for CD-ROM of personal computer, and a holder for optical disk;

(3) in communication equipment, such as in a holder for compact high performance mike or speaker of a portable telephone, a pocket bell or PHS, a mike holder for a wireless equipment, and a disk holder for portable note type electronic equipment;

(4) in home electronics equipment, such as in insulators for CD-ROM of home TV game, insulators for cassette holder or CD-ROM of cassette holder or game machine, a holder of high performance mike, and cone edge of speaker; and (5) in other applications, such as in damping materials for printer head of a wordprocessor, printer of personal computer, small or middle handy type printer, or name printers, and insulators for CD-ROM used for measure equipment.

In the following, the present invention will be described in more detail with reference to non-limitative examples. The following examples are presented for purposes of illustration only and are not to be construed in a limiting sense.

EXAMPLE 1

A nitrogen purged Brabender mixer (50 g capacity) equipped with a roller blade was initially set to 60 rpm and the temperature was set to 275° C. The mixer was then charged with 5 g of syndiotactic polystyrene and 13 g of commercial SEBS (Shell Kraton 1652G styrene/butadiene before hydrogenation is 27/73) and 20 g of paraffinic oil. The mixture was agitated in the mixer for 20 minutes after which the heating element was turned off, the agitation was turned off and the mixture was allowed to cool to about 160° C. at a rate of ~4° C./min. The polymer blend was removed from the mixer and displayed the properties shown in Table 1. A control polymer was prepared in the same manner, absent the 5 g of syndiotactic polystyrene and displayed the properties shown in Table 1 as Comparative Example 1. The Compression Set was measured based on conditions of ASTM D395-89, except that the sample size an displacement were changed as follows: Sample height—15 mm; Sample diameter—8 mm; Displacement-Sample is compressed to 10 mm and stored in an oven at 100° C. (or at 150° C. in subsequent examples) for 22 hours. The sample is removed from the oven, the stress on the sample is relieved, the sample is stored at room temperature for 30 minutes and the recovery of the sample is measured as the final sample height as X in: Compression Set=((15−X)/(15−10))×100%.

TABLE 1

| Example No. | 1 | Comparative Example 1 |
|---|---|---|
| Paraffin Oil Content | 50% | 50% |
| Compression Set 100° C. for 22 hrs. | 68% | Flow |

EXAMPLE 2

The procedure and the control of Example 1 were repeated with minor changes in the amounts of materials and conditions. The mixer of 160° C. was charges with 13.2 g of commercial SEBS (Shell Kraton 1652G), 8.1 g of syndiotactic polystyrene and 20 g of paraffinic oil. The mixture was then heated to 280° C. The mixture was allowed to be agitated in the mixer for 20 minutes at 60 rpm. The heating element was turned off, the agitation was turned off and the mixture was allowed to cool to about 160° C. at a rate of approximately 4° C./min. Then, the gel material was removed from the mixer and displayed the compression set properties shown in Table 2. A control polymer as a comparative example (not shown) was prepared in the same manner, absent the 8.1 g of syndiotactic polystyrene, and flowed at the compression set temperatures shown in Table 2.

EXAMPLES 3 to 6

The procedure and the control of Example 2 were repeated with minor changes of the amounts of materials. At 160° C., the mixer was charged with 20 g of paraffinic oil and varying ratios of commercial SEBS and syndiotactic polystyrene ranging between approximately 20% by weight to 75% by weight of sPS and the remainder being SEBS, and the resulting mixtures and controls having no syndiotactic polystyrene were processed according to the procedure in Example 2. Then, each sample of the gel material was removed from the mixer. The polymer gels were molded at 290° C. in a press oven for about 10 minutes. The mold was then cooled down at a rate of 3° C./min. The resultant gels displayed the properties shown in Table 2. The control polymers prepared as comparative examples (not shown) in the same manner, absent the syndiotactic polystyrene, all flowed at the compression set temperatures shown in Table 2.

TABLE 2

| Example No. | 3 | 4 | 2 | 5 | 6 |
|---|---|---|---|---|---|
| sPS % | 20% | 30% | 40% | 60% | 75% |
| Oil Content | 50% | 50% | 50% | 50% | 50% |
| Compression Set 100° C. (22 hrs) | 76 | 79 | 79 | 90 | 97 |
| Shore A @ 23° C. | 8 | 14 | 14 | 14 | 14 |
| Tan δ @ 30° C. | 0.31 | 0.25 | 0.15 | 0.15 | 0.22 |
| Tan δ @ 100° C. | 0.46 | 0.33 | 0.16 | 0.14 | 0.20 |

EXAMPLE 7

A nitrogen purged Brabender mixer (50 g capacity) equipped with a roller blade was initially set to 60 rpm and the temperature was set to 65° C. The mixer was then charged with 5.0 g of sPS, 20 g of SBR(Duradene 706 having 23.5% styrene, 11% vinyl content and a $ML_4$ at 100° C.=55) 0.05 g of anti-oxidant and 25.0 g of aromatic oil. The oil was slowly charged to the polymers at a rate of about 2 ml/min for good mixing. The mixture was agitated in the mixer for a total 45 minutes. The mixture was removed from the mixer. The polymer gel was molded at 290° C. in a press oven for 10 minutes. The mold was then cooled down at a rate of 3° C./min. to prevent the delta-phase formation of sPS. The gel produced by this process displayed the properties shown in Table 3.

EXAMPLE 8

The procedure of Example 7 were repeated with minor changes in the amounts of materials. The mixer of 65° C. was charged with 10.0 g of sPS, 15.0 g of SBR, 0.5 g of anti-oxidant and 25.0 g of aromatic oil. The resulting gel material was a dough-like material, displaying the properties shown in Table 3, and was very stable at room temperature for several months prior to molding.

COMPARATIVE EXAMPLE 2

For a control sample, 25.0 g of SBR was mixed with 25.0 g aromatic oil and 0.5 g of anti-oxidant in the same manner as described in Example 8 without using syndiotactic polystyrene and the resultant polymer displayed the properties shown in Table 3.

COMPARATIVE EXAMPLE 3

For a control sample, sPS was mixed with aromatic oil in a weight ratio of 1:4 and an anti-oxidant in the same manner as described in Example 8 without using an elastomer and the resultant polymer displayed the properties shown in Table 3.

TABLE 3

| Example No. | 7 | 8 | Comparative Example 2 | Comparative Example 3 |
|---|---|---|---|---|
| Polymer | SBR/sPS | SBR/sPS | SBR | sPS |
| SBR/sPS | 80/20 | 60/40 | 100/0 | 0 |
| Compression Set | | | | |
| 100° C. (22 hrs) | 12 | 13 | 25 | — |
| 150° C. (22 hrs) | 23 | 14 | 46 | — |
| Shore A @ 22° C. | 8 | 12 | 3 | 71 |
| $T_b$ (psi) | 99.2 | 67.5 | 20.1 | — |

TABLE 3-continued

| Example No. | 7 | 8 | Comparative Example 2 | Comparative Example 3 |
|---|---|---|---|---|
| Elongation $E_b$, % @ 22° C. | 1643.0 | 1309.0 | 568.9 | — |

As shown in Table 3, while the set properties of Comparative Example 2 were not bad, the mechanical strength, especially $T_b$, is too weak for practical use. The extended sPS in Comparative Example 3 lacked elasticity and elongation and was too hard for any utility applications requiring softness.

What is claimed is:

1. An extended polymer composition comprising:
   100 parts by weight of a polymer blend component comprising 5 to 50% by weight of a poly(vinyl aromatic hydrocarbon) polymer having a syndiotactic configuration and 95 to 50% by weight of an elastomeric polymer; and
   at least 30 parts by weight of an extender comprising an extender oil, blended sufficiently to form a polymer gel;
   said composition having a Shore A hardness ranging from about 0 to about 50 at about 20° C. to 25° C.

2. The extended polymer composition of claim 1 wherein said syndiotactic poly(vinyl aromatic hydrocarbon) polymer is prepared by polymerizing a monomer selected from the group consisting of styrene, alpha-methylstyrene, p-methylstyrene, and mixtures thereof.

3. The extended polymer composition of claim 1 wherein said elastomeric polymer is selected from the group consisting of polybutadiene, polyisoprene, polyisobutylene, acrylic rubber, urethane rubber, silicone rubber, epichlorohydrin rubber, styrene/butadiene rubber (SBR), styrene/isoprene rubber (SIR), styrene/isoprene/butadiene rubber (SIBR), styrene-butadiene-styrene block copolymer (SBS), styrene-butadiene block copolymer (SB), hydrogenated styrene-butadiene-styrene block copolymer (SEBS), hydrogenated styrene-butadiene block copolymer (SEB), styrene-isoprene-styrene block copolymer (SIS), styrene-isoprene block copolymer (SI), hydrogenated styrene-isoprene block copolymer (SEP) and hydrogenated styrene-isoprene-styrene block copolymer (SEPS), ethylene-ethylene/butylene block copolymer (EEB), ethylene-ethylene/butylene/styrene block copolymer (hydrogenated BR-SBR block copolymer), styrene-ethylene/butylene-ethylene block copolymer (SEBE), ethylene-ethylene/butylene-ethylene block copolymer (EEBE) and mixtures thereof.

4. The extended polymer composition of claim 1 further comprising from 1 to 350 parts of a inorganic filler, additive or compounding ingredient based on 100 parts by weight of the polymer blend component.

5. The extended polymer composition of claim 1 wherein the elastomeric polymer is a conjugated diene/vinyl aromatic block copolymer.

6. The extended polymer composition of claim 1 wherein the elastomeric polymer is hydrogenated styrene/butadiene/styrene block copolymer rubber (SEBS).

7. The extended polymer composition of claim 1 wherein the elastomeric polymer is a butadiene/styrene rubber.

8. The extended polymer composition of claim 1 comprising an extended (butadiene/styrene copolymer-syndiotactic polystyrene blend).

9. The extended polymer composition of claim 1 wherein the extender is present in an amount between about 30 to about 1000 parts by weight per 100 parts by weight of the polymer blend.

10. The extended polymer composition of claim 1 wherein the extender is an organic material consisting of at least one compound selected from the group consisting of: softening agents, plasticizers, tackifiers, oligomers, lubricants and petroleum hydrocarbons.

11. The extended polymer composition of claim 1 wherein the composition is in the form of a gel.

12. The extended polymer composition of claim 1 wherein said poly(vinyl aromatic hydrocarbon) polymer is polystyrene.

13. The extended composition of claim 1 comprising:
   100 parts by weight of a polymer blend component comprising 5 to 50% by weight of a poly(vinyl aromatic hydrocarbon) polymer having a syndiotactic configuration and 95 to 50% by weight of an elastomeric polymer; and
   at least 30 parts by weight of an extender comprising an extender oil, blended sufficient to form a polymer gel;
   wherein said composition has a mechanical strength $T_b$, substantially greater than 20.1, and an Elongation $E_b$% @22° C. substantially greater than 568.9.

14. The extended polymer composition of claim 1, wherein the extender is an oil selected from the group consisting of naphthenic oils, aromatic oils, paraffinic petroleum oils, and silicone oils.

15. The extended polymer composition of claim 9, wherein the extender oil is present in an amount the range of 50 to 500 parts by weight per 100 parts by weight of the polymer blend.

16. The extended polymer composition of claim 15, wherein the extender oil is present in an amount the range of 80 to 300 parts by weight per 100 parts by weight of the polymer blend.

17. A flexible, molded thermoplastic elastomer article comprising:
   100 parts by weight of a polymer blend component comprising 5 to 50% by weight of a poly(vinyl aromatic hydrocarbon) polymer having syndiotactic configuration and 95 to 50% by weight of an elastomeric polymer; and
   at least 30 parts by weight of an extender comprising extender oil blended sufficiently to form a polymer gel;
   said composition having a Shore A hardness ranging from about 0 to about 50 at about 20° C. to 25° C.

18. The flexible, molded thermoplastic elastomer article of claim 17 wherein the elastomeric polymer is a conjugated diene/vinyl aromatic copolymer or a hydrogenated conjugated diene/vinyl aromatic copolymer.

19. The flexible, molded thermoplastic elastomer article of claim 17 wherein the elastomeric polymer is hydrogenated styrene/butadiene/styrene copolymer rubber (SEBS).

20. The flexible, molded thermoplastic elastomer article of claim 17 wherein said syndiotactic poly(vinyl aromatic hydrocarbon) polymer is prepared by polymerizing a monomer selected from the group consisting of styrene, alpha-methylstyrene, p-methylstyrene, and mixtures thereof.

21. The flexible, molded thermoplastic elastomer article of claim 17 wherein said syndiotactic poly(vinyl aromatic hydrocarbon) polymer is polystyrene.

22. The flexible, molded thermoplastic elastomer article of claim 17 wherein said elastomeric polymer is selected from the group consisting of polybutadiene, polyisoprene, polyisobutylene, acrylic rubber, urethane rubber, silicone rubber, epichlorohydrin rubber, styrene/butadiene rubber (SBR), styrene/isoprene rubber (SIR), styrene/isoprene/butadiene rubber (SIBR), styrene-butadiene-styrene block copolymer (SBS), styrene-butadiene block copolymer (SB), hydrogenated styrene-butadiene-styrene block copolymer (SEBS), hydrogenated styrene-butadiene block copolymer (SEB), styrene-isoprene-styrene block copolymer (SIS), styrene-isoprene block copolymer (SI), hydrogenated styrene-isoprene block copolymer (SEP) and hydrogenated styrene-isoprene-styrene block copolymer (SEPS), ethylene-ethylene/butylene block copolymer (EEB), ethylene-ethylene/butylene/styrene block copolymer (hydrogenated BR-SBR block copolymer), styrene-ethylene/butylene-ethylene block copolymer (SEBE), ethylene-ethylene/butylene-ethylene block copolymer (EEBE) and mixtures thereof.

23. The flexible, molded thermoplastic elastomer article of claim 17 further comprising from 1 to 350 parts of a inorganic filler, additive or compounding ingredient based on 100 parts by weight of the polymer blend component.

24. The flexible, molded thermoplastic elastomer article of claim 17 wherein the extender is an organic material consisting of at least one compound selected from the group consisting of: softening agents, plasticizers, tackifiers, oligomers, lubricants and petroleum hydrocarbons.

25. The flexible, molded thermoplastic elastomer article of claim 17 wherein the extender is an oil selected from the group consisting of silicone oil, aromatic oil, naphthenic oil and paraffinic oil.

26. An extended polymer composition comprising:
    100 parts by weight of a polymer blend component comprising 5 to 50% by weight of a poly(vinyl aromatic hydrocarbon) polymer having a syndiotactic configuration and 95 to 50% by weight of an elastomeric polymer; and
    at least 30 parts by weight of an extender comprising an organic material having a number-average molecular weight of loss than 20,000, blended sufficiently to form a polymer gel, the organic material being selected from the group consisting of:
        (1) softening agents, selected from the group consisting of aromatic naphthenic and paraffinic softening agents;
        (2) plasticizers, selected from the group consisting of phthalic esters, mixed phthallc esters, aliphatic dibasic add esters, fatty acid esters, phosphoric acid esters, epoxy plasticizers, and phthalate, adipate, sebacate, and phosphate polyether and polyester plasticizers;
        (3) tackifiers, selected from the group consisting of coumarone resins, cournarone-indene resins, terpene phenol resins, and rosin derivatives;
        (4) oligomers, selected from the group consisting of crown ether, fluorine-containing oligomers, polybutenes, xylene resins, chlorinated rubber, polyethylene wax, polyalkylene glycol diacrylate, liquid rubbers, silicone oligomers, and poly-α-olefins;
        (5) lubricants, selected from the group consisting of hydrocarbon lubricants selected from paraffin, wax, higher fatty acids, hydroxy-fatty acids, fatty acid amides, alkylene-bis-fatty acid amides, fatty acid-lower alcohol esters, fatty acid-polyhydric alcohol esters, fatty acid-polyglycol esters, fatty alcohols, polyhydric alcohols, polyglycol, polyglycerol, and metallic soaps;
        (6) petroleum hydrocarbons, selected from the group consisting of synthetic terpene resins, aromatic hydrocarbon resins, aliphatic hydrocarbon resins, aliphatic cyclic hydrocarbon resins, alicyclic petroleum resins, aliphatic petroleum resins, aromatic petroleum resins, polymers of unsaturated hydrocarbons, and hydrogenated hydrocarbon resins; and
        (7) bituminous compositions and phosphazenes; and combinations thereof;
    said composition having a Shore A hardness ranging from about 0 to about 50 at about 20° C. to 25° C.

27. The extended polymer composition of claim 26, wherein said composition has a mechanical strength $T_b$, substantially greater than 20.1, and Elongation $E_b\%$ @ 22° C. substantially greater than 568.9.

28. A flexible, molded thermoplastic elastomer article comprising:
    100 parts by weight of a polymer blend component comprising 5 to 50% by weight of a poly(vinyl aromatic hydrocarbon) polymer having syndiotactic configuration and 95 to 50% by weight of an elastomeric polymer; and
    at least 30 parts by weight of an extender comprising an organic material having a number-average molecular weight of less than 20,000, blended sufficiently to form a polymer gel, the organic material being selected from the group consisting of:
        (1) softening agents, selected from the group consisting of aromatic naphthenic and paraffinic softening agents;
        (2) plasticizers, selected from the group consisting of phthalic esters, mixed phthallc esters, aliphatic dibasic acid esters, fatty acid esters, phosphoric acid esters, epoxy plasticizers, and phthalate, adipate, sebacate, and phosphate polyether and polyester plasticizers;
        (3) tackifiers, selected from the group consisting of coumarone resins, coumarone-indene resins, terpene phenol resins, and rosin derivatives;
        (4) oligomers, selected from the group consisting of crown ether, fluorine-containing oligomers, polybutenes, xylene resins, chlorinated rubber, polyethylene wax, polyalkylene glycol diacrylate, liquid rubbers, silicone oligomers, and poly-α-olefins;
        (5) lubricants, selected from the group consisting of hydrocarbon lubricants selected from paraffin, wax, higher fatty acids, hydroxy-fatty acids, fatty acid amides, alkylene-bis-fatty acid amides, fatty acid-lower alcohol esters, fatty acid-polyhydric alcohol esters, fatty acid-polyglycol esters, fatty alcohols, polyhydric alcohols, polyglycol, polyglycerol, and metallic soaps;
        (6) petroleum hydrocarbons, selected from the group consisting of synthetic terpene resins, aromatic hydrocarbon resins, aliphatic hydrocarbon resins, aliphatic cyclic hydrocarbon resins, alicyclic petroleum resins, aliphatic petroleum resins, aromatic petroleum resins, polymers of unsaturated hydrocarbons, and hydrogenated hydrocarbon resins; and
        (7) bituminous compositions and phosphazenes; and combinations thereof;
    said composition having a Shore A hardness ranging from about 0 to about 50 at about 20° C. to 25° C.

* * * * *

UNITED STATES PATENT AND TRADEMARK OFFICE
CERTIFICATE OF CORRECTION

PATENT NO.    : 6,191,197 B1
DATED         : February 20, 2001
INVENTOR(S)   : Xiaorong Wang et al.

It is certified that error appears in the above-identified patent and that said Letters Patent is hereby corrected as shown below:

Column 13,
Line 37, "loss" should read -- less --.
Line 45, "add" should read -- acid --.
Line 50, "cournarone" should read -- coumarone --.
Line 44, "phthallc", each occurrence, should read -- phthalic --.

Column 14,
Line 33, "phthallc", each occurrence, should read -- phthalic --.

Signed and Sealed this

Twenty-third Day of July, 2002

*Attest:*

JAMES E. ROGAN
*Attesting Officer*   *Director of the United States Patent and Trademark Office*